United States Patent
Ono et al.

(10) Patent No.: US 8,872,064 B2
(45) Date of Patent: Oct. 28, 2014

(54) POSITIONING CONTROL SYSTEM FOR MOVING ELEMENT AND LASER DRILLING MACHINE

(75) Inventors: Takashi Ono, Ebina (JP); Souichi Toyama, Ebina (JP); Yaichi Okubo, Ebina (JP); Hiromu Hirai, Nagoya (JP)

(73) Assignees: Via Mechanics, Ltd., Ebina-shi (JP); National University Corporation Nagoya Institute of Technology, Aichi (JP)

( * ) Notice: Subject to any disclaimer, the term of this patent is extended or adjusted under 35 U.S.C. 154(b) by 1174 days.

(21) Appl. No.: 11/707,153

(22) Filed: Feb. 16, 2007

(65) Prior Publication Data

US 2007/0227773 A1 Oct. 4, 2007

(30) Foreign Application Priority Data

Mar. 30, 2006 (JP) .................................. 2006-094719
Aug. 31, 2006 (JP) .................................. 2006-236121

(51) Int. Cl.
*B23K 26/00* (2014.01)
*G05B 13/02* (2006.01)
*G05B 11/18* (2006.01)
*G05B 19/23* (2006.01)

(52) U.S. Cl.
CPC .... *G05B 19/231* (2013.01); *G05B 2219/41029* (2013.01); *G05B 2219/41127* (2013.01); *G05B 2219/45139* (2013.01)
USPC ............... 219/121.7; 700/37; 700/56; 700/69; 700/166; 700/159; 318/590; 318/594; 318/616; 318/624; 318/652

(58) Field of Classification Search
CPC ................... G05B 19/231; G05B 2219/41029; G05B 2219/41127; G05B 2219/45139
USPC ................. 700/56, 37, 166, 69, 159; 175/24; 318/590, 594, 616, 624, 652, 561; 219/121.7

See application file for complete search history.

(56) References Cited

U.S. PATENT DOCUMENTS 4,841,208 A * 6/1989 Itoh ............................... 318/561
5,157,597 A * 10/1992 Iwashita ......................... 700/37
(Continued)

FOREIGN PATENT DOCUMENTS

JP    2724787 B2    12/1997
JP    2002-40357 A   2/2002
(Continued)

OTHER PUBLICATIONS jp2002-367307A.pdf is a machine translation.*
jp3352715B2.pdf is a machine translation.*
T. Katayama, *Fundamentals of Feedback Control*, Chapters 6 to 7, Asakura Publishing Co., Ltd., May 20, 1987, pp. 104-138.

*Primary Examiner* — Dana Ross
*Assistant Examiner* — Ket D Dang
(74) *Attorney, Agent, or Firm* — Crowell & Moring LLP

(57) ABSTRACT

A positioning control system for positioning a moving element on a basis of position command data is provided with a feedback loop. The system is also provided with a loop gain modifier for determining a loop gain, which is to be used in a following positioning operation, on a basis of a difference between an amount of overshoot measured in a current positioning operation and a predetermined tolerance or on a basis of a difference between an amount of overshoot measured in a current positioning operation and a first predetermined tolerance and a difference between an amount of undershoot measured in the current positioning operation and a second predetermined tolerance. The first and second tolerances may preferably be the same in absolute value. The moving element may specifically be a steerable mirror for drilling holes in a work by reflecting a laser beam. Also disclosed is a laser drilling machine including the system.

14 Claims, 7 Drawing Sheets

(56) References Cited

U.S. PATENT DOCUMENTS

| | | | |
|---|---|---|---|
| 5,589,748 A * | 12/1996 | Kazama et al. | 318/560 |
| 6,714,842 B1 * | 3/2004 | Ito | 700/302 |
| 6,961,628 B2 * | 11/2005 | Yutkowitz | 700/37 |
| 2005/0128553 A1 * | 6/2005 | Toyama et al. | 359/225 |
| 2005/0187650 A1 * | 8/2005 | Toyama et al. | 700/166 |

FOREIGN PATENT DOCUMENTS

| | | | |
|---|---|---|---|
| JP | 2002-40358 A | 2/2002 | |
| JP | 3352715 B2 | 9/2002 | |
| JP | 2002-367307 A | 12/2002 | |
| JP | 2002367307 A * | 12/2002 | G11B 21/10 |
| JP | 2003-43404 A | 2/2003 | |

\* cited by examiner

POSITIONING CONTROL SYSTEM FOR MOVING ELEMENT AND LASER DRILLING MACHINE

FIELD OF THE INVENTION

This invention relates to a positioning control system for a moving element, which detects the position of the moving element and controls the moving element so that the moving element tracks designated target points, and also to a laser drilling machine capable of controlling a moving element by such positioning control system.

DESCRIPTION OF THE RELATED ART

High-speed and high-accuracy positioning systems for moving elements are widely used in industry, including precision machine tools, storage devices for computers, and semiconductor fabrication systems. For a laser drilling machine for performing drilling in a fabrication process of a printed circuit board, for example, a positioning control system is required to successively irradiating with a laser beam onto plural work positions on a work. A steerable mirror control system is often used to achieve high throughput and high-accuracy machining.

In general, a laser drilling machine is a numerical controlled (NC) machine with a hierarchical control, and a steerable mirror control system is included in the lowest level. In a control system of a upper level (hereinafter called "the upper-level control"), the procedure of drilling is optimized on the basis of CAM (Computer Aided Manufacturing) data for a printed circuit board to achieve a high throughput, and hole position coordinates are described in the order of their drilling in an NC program.

Such an NC program is prepared beforehand. When drilling begins, the upper-level control successively transforms the hole position coordinates in the program, and transmits time-series angle command data to the steerable mirror control system. Drilling of a hole into a true circle needs to emit a laser beam after a steerable mirror has come to rest at an angle commanded by the angle command data. Transmission control of the angle command data and emission control of the laser beam are, therefore, synchronized by the upper-level control.

The steerable mirror control system includes, as its principal elements, an actuator (rotary actuator) and a control circuit. The rotary actuator is provided with a rotor shaft, on which the steerable mirror is fixedly mounted, and serves to change the angle of the steerable mirror by rotating the rotor shaft. The control circuit serves to feed back the angle of the steerable mirror.

As the rotary actuator, an electromagnetic rotary actuator that generates drive torque electromagnetically is often employed. This rotary actuator also includes a built-in sensor for detecting the angle of the steerable mirror, and the detected angle data are fed back to the control circuit. This control circuit can be implemented by an analog control unit composed of an operational amplifier, or by a digital control firmware constructed in combination of a microprocessor and a program. Especially in recent years, there has been an increasing move toward higher work efficiency by flexibly improving the efficiency of the control program in a short period by the latter construction.

The steerable mirror control system receives a piece of the angle command data as a step input signal, and performs a single positioning operation. Specifically, based on the received single piece of angle the command data, the steerable mirror control system rotates the steerable mirror. When the steerable mirror begins its rotation, an integral compensation functions to bring the angle of the steerable mirror into conformity with the angle command data without any error. In this compensation, a value obtained by subtracting the detected angle data from the angle command data, in other words, a tracking error signal is integrated with respect to time. For the assurance of a stable operation of the feedback loop in the steerable mirror control system, it is necessary to set a phase margin and a gain margin sufficiently large in a loop transfer function. A stabilization compensation or phase lead compensation by an angular velocity signal is, therefore, effected by differentiating the detected angle data or using a so-called state observer. These control methods are well-known as a basis of the feedback control theorem (KATAYAMA, Tohru, "Fundamentals of Feedback Control" (written in Japanese), Chapters 6 to 7, Asakura Publishing Co., Ltd., (May 20, 1987)).

To shorten the positioning time required by the steerable mirror, a method of expanding bandwidth of the feedback loop is also used. In the case of the above-mentioned electromagnetic rotary actuator, axial-torsional vibrations may occur in a high-speed operation because the steerable mirror, sensor and the like mounted on the rotor shaft act as an inertial load. Since a plurality of torsional vibration modes generally exist in the range more than several kilohertz, the conventional steerable mirror control systems include those equipped with stabilizing compensators for the respective vibration modes to expand the bandwidth of their feedback loops. Each one of the stabilizing compensators estimates the state value of the corresponding torsional vibration mode and feedbacks the same (JP-A-2002-40357 and JP-A-2002-40358).

The conventional steerable mirror control systems also include those capable of performing filtering on each angle command data while taking into consideration natural vibrations of a motor into consideration to suppress residual vibrations (JP-A-2003-43404).

These methods can be combined with the above-mentioned integral compensation and phase lead compensation to construct a feedback loop. Characteristics of this feedback loop may preferably be adjusted so that the time required for a single positioning operation meets a target specification and an overshoot and residual torsional vibrations contained in a transient response (settling response) in a neighborhood of each target angle fall within their corresponding tolerance ranges.

It is also to be noted that characteristics of the electromagnetic rotary actuator vary when the internal temperature of the actuator rises due to the generation of heat by its coil. Variations in the characteristics of such an actuator as a result of a change in temperature due to self-generated heat or the like may take place in many precise positioning control systems. In a hard disk drive, for example, a VCM inter-terminal voltage and VCM current of a voice coil motor (VCM) during positioning (following) to a desired track are measured by a VCM inter-terminal voltage detection circuit and VCM current detection circuit, respectively, the measurement results are introduced into a drive control unit via their corresponding analog-to-digital (A/D) converters to calculate the resistance value of the coil and then to estimate the temperature inside the actuator, and based on the estimation result, a loop gain is modified (JP-A-2002-367307).

Another VCM control system varies the gain of transmission characteristics of its electrical system coincidently with the calculated temperature of the magnetic element of the VCM. The calculation is performed in the following steps:

applying a voltage to the VCM for a predetermined constant time to measure a current flowing through the VCM; calculating a temperature inside the VCM from the value of the measured current; detecting a surrounding temperature in a neighborhood of the rotary actuator is detected by a temperature measurement means; and calculating a temperature of the magnetic element considering thermal gradient between the VCM and the temperature measurement means (JP-B-3352715).

In addition, positioning systems applied to X-Y stages in semiconductor exposure systems include those equipped with a test signal generation unit and a control gain adjustment unit such that from a sinusoidal wave generated from the test signal generation unit, an optimal control gain can be set by the control gain adjustment unit (JP-B-2724787).

To improve the throughput of a laser drilling machine, there is an increasing trend toward shortening the time interval (hereinafter called "the command interval") of step signals which are indicative of an angle command pattern (in other words, angle command values). For making the command interval shorter, it is effective to emit a laser beam after the settling response of the steerable mirror has fallen within a tolerance range (hereinafter called "the settling range") but before the steerable mirror comes to complete rest, and then, to immediately move to the following positioning operation.

With the conventional steerable mirror control systems, however, the time until the settling response of the steerable mirror falls within a settling range may become longer depending on the drilling conditions.

None of the above-described conventional art discloses any means for suppressing an increase in overshoot in the settling response as caused by a change in temperature.

In the above-described conventional art on the hard disk drive, no means is disclosed for modifying the loop gain in the control that keeps on tracking a target value which successively varies like step signals.

SUMMARY OF THE INVENTION

Objects of the present invention are, therefore, to provide a positioning control system for a moving element and a laser drilling machine, both of which are excellent in positioning accuracy, by suppressing an increase in overshoot in a settling response caused by a change in temperature.

The present inventors found that in a conventional steerable mirror control system, a failure to make the settling response of the steerable mirror fall within the settling range in a short time often occurs when the interval between working positions lies in a particular range. The present inventors also ascertained that the failure takes place following the steps to be described hereinafter. Described specifically, a need arises to feed a large current to the coil upon acceleration or deceleration of the steerable mirror. When drilling is continuously performed at working positions in a specific range or area, the heat generated in the coil, therefore, increases rapidly. As a result, the internal temperature of the electromagnetic rotary actuator also rises rapidly. A strong magnet has such characteristics that its coercive force and magnetic flux density decrease in higher temperature, and this would reduce torque constant of the rotary actuator significantly. Therefore, the rapid rise in the internal temperature of the electromagnetic rotary actuator leads to a greater overshoot in the settling response, and hence, to an increased positioning time for the steerable mirror.

Based on the above-described findings, the present invention provides, in one aspect thereof, a positioning control system for positioning a moving element on a basis of position command data, said positioning control system being provided with a feedback loop, comprising:

a loop gain modifier for determining a loop gain, which is to be used in a following positioning operation, on a basis of a difference between an amount of overshoot measured in a current positioning operation and a predetermined tolerance.

The moving element may be, for example, a steerable mirror for drilling holes in a work by reflecting a laser beam. Based on a distance or angle over which the moving element is to be moved in the current positioning operation, the loop gain modifier may preferably determine whether or not a modification is to be performed.

In another aspect of the present invention, there is also provided a positioning control system for positioning a moving element on a basis of position command data, said positioning control system being provided with a feedback loop, comprising:

a loop gain modifier for determining a loop gain, which is to be used in a following positioning operation, on a basis of a difference between an amount of overshoot measured in a current positioning operation and a first predetermined tolerance and a difference between an amount of undershoot measured in the current positioning operation and a second predetermined tolerance.

The moving element may be, for example, a steerable mirror for drilling holes in a work by reflecting a laser beam. Based on a distance or angle over which the moving element is to be moved in the current positioning operation, the loop gain modifier may preferably determine whether or not a modification is to be performed. An absolute value of the first tolerance and an absolute value of the second tolerance may be, for example, the same with each other.

In a further aspect of the present invention, there is also provided a laser drilling machine comprising one of the above-described positioning control systems.

The present invention makes it possible to suppress an increase in overshoot in a settling response caused by an increase in temperature, and therefore, to perform high-speed and high-accuracy positioning of a moving element.

DETAILED DESCRIPTION OF THE PREFERRED EMBODIMENTS

Embodiments of the present invention as applied to a steerable mirror control system will hereinafter be specifically described based on Examples.

Example 1

Figure 1:
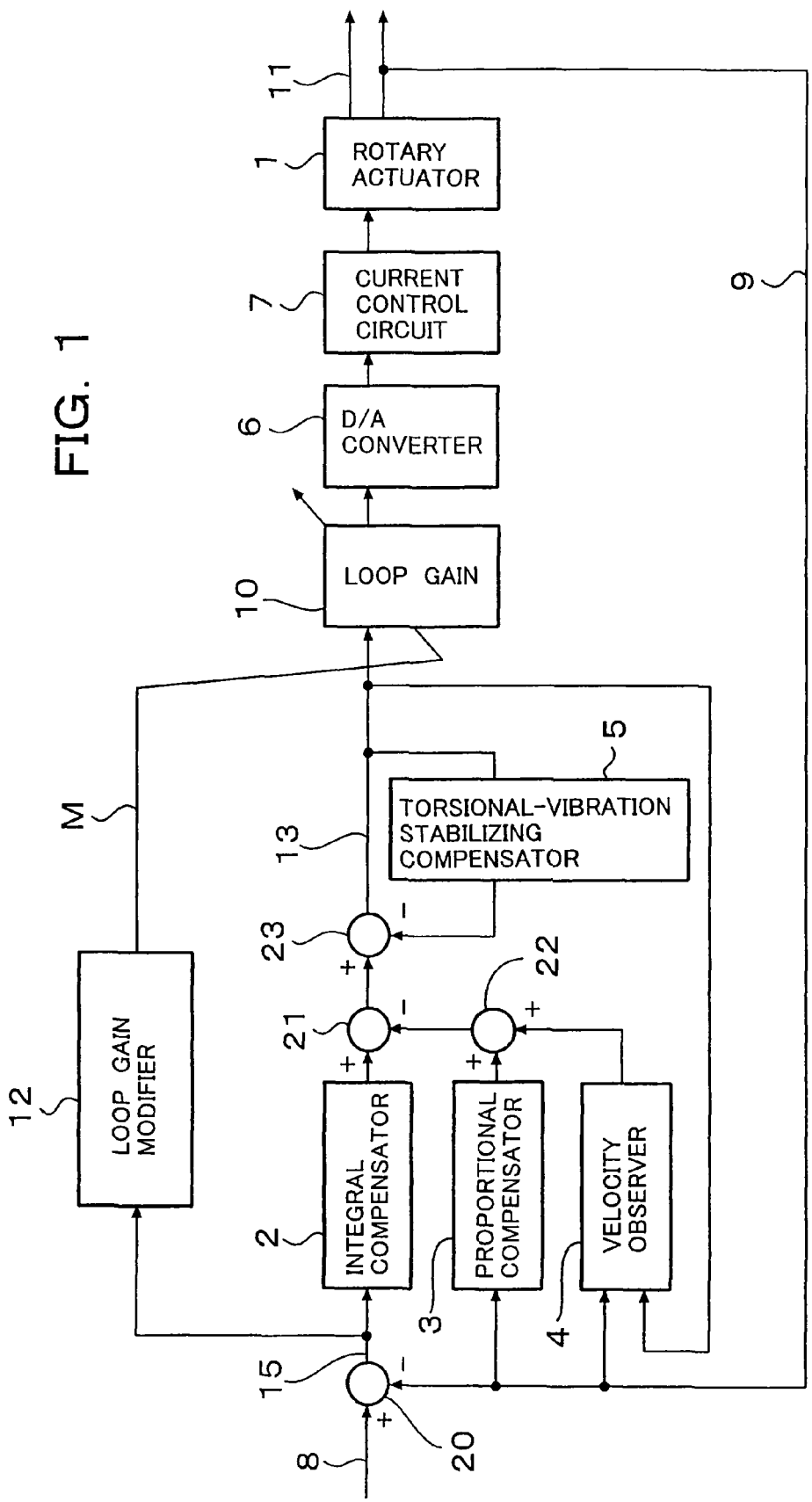
FIG. 1 is a block diagram of a steerable mirror control system in Example 1 of the present invention.

Referring first to FIG. 1, a steerable mirror control system according to Example 1 of the present invention will be described. This steerable mirror control system has been implemented as a digital control firmware making use of a microprocessor, the illustration of which is omitted in FIG. 1. Processings at an integral compensator 2, proportional compensator 3, velocity observer 4, torsional-vibration stabilizing compensator 5, loop gain 10, loop gain modifier 12 and adders 20,21,22,23 are described in parts of a program which the above-described microprocessor performs. At a discrete time in every constant sampling cycle (hereinafter called "the discrete time"), a processing operation is performed.

On a rotary actuator 1, a single steerable mirror (not shown) is mounted, and an angle of the steerable mirror is used as a controlled variable signal 11 in the steerable mirror control system. The rotary actuator 1 is also provided with a built-in rotary encoder (not shown), which outputs detected angle data 9 at every discrete time.

A description will next be made about steps through which the steerable mirror control system positions the steerable mirror.

When the discrete time is started, the adder (subtractor) 20 subtracts the detected angle data 9 from angle command data 8 which are position command data commanded from a upper-level control, and outputs the results as a tracking error 15 to the integral compensator 2 and loop gain modifier 12. The integral compensator 2 computes a time integral of the tracking error 15, and outputs the operation results to the adder 21. The loop gain modifier 12 computes a correction value M from the tracking error 15, and outputs it to the loop gain 10. The loop gain modifier 12 is an important element in the present invention, and therefore, will be described in detail subsequently herein.

The proportional compensator 3 multiplies the detected angle data 9 by a proportional gain coefficient, and outputs the results to the adder 22. The velocity observer 4 computes an estimated value of angular velocity of the steerable mirror from an output of the adder 23 and the detected angle data 9, and outputs the results to the adder 22. The adder 22 adds together the outputs from the proportional compensator 3 and velocity observer 4, and outputs the sum to the adder 21. The adder 21 subtracts the output of the adder 22 from the output of the integral compensator 2, and outputs the difference to the adder 23.

The adder 23 subtracts an output of the torsional-vibration stabilizing compensator 5 from the output of the adder 21, and outputs a manipulated variable 13 to the loop gain 10. It is to be noted that the torsional-vibration stabilizing compensator 5 serves to stabilize the feedback loop of the steerable mirror control system against one or more torsional vibration modes which the rotary actuator 1 has.

The loop gain 10 multiplies the manipulated variable 13 by $\alpha$. The coefficient $\alpha$ is subjected to a modification at the loop gain modifier 12.

The D/A converter 6 converts an output of the loop gain 10 into an analog value. This analog value is a current command value, and a current control circuit 7 feeds a drive current to the rotary actuator 1 in such a way that the drive current tracks the current command value.

A description will next be made about the loop gain modifier 12 which is an important element in the present invention as mentioned above.

The loop gain modifier 12 is equipped with a storage unit, timer unit, comparison unit, decision unit, computing unit and so on. In the storage unit, an amount $NO_v$ of nominal overshoot, a coefficient KP to be described subsequently herein and the correction value M are stored. The amount $NO_v$ of nominal overshoot is an overshoot amount sufficient to meet a target specification. Assuming that the settling range of a setting response is ±W, the amount $NO_v$ of nominal overshoot can be, for example, ±0.3 W. The correction value M is provided for each rotating direction. The correction value is represented by $M_{cw}$ when the steerable mirror is rotated clockwise, and by $M_{ccw}$ when the steerable mirror is rotated counterclockwise.

Figure 2:
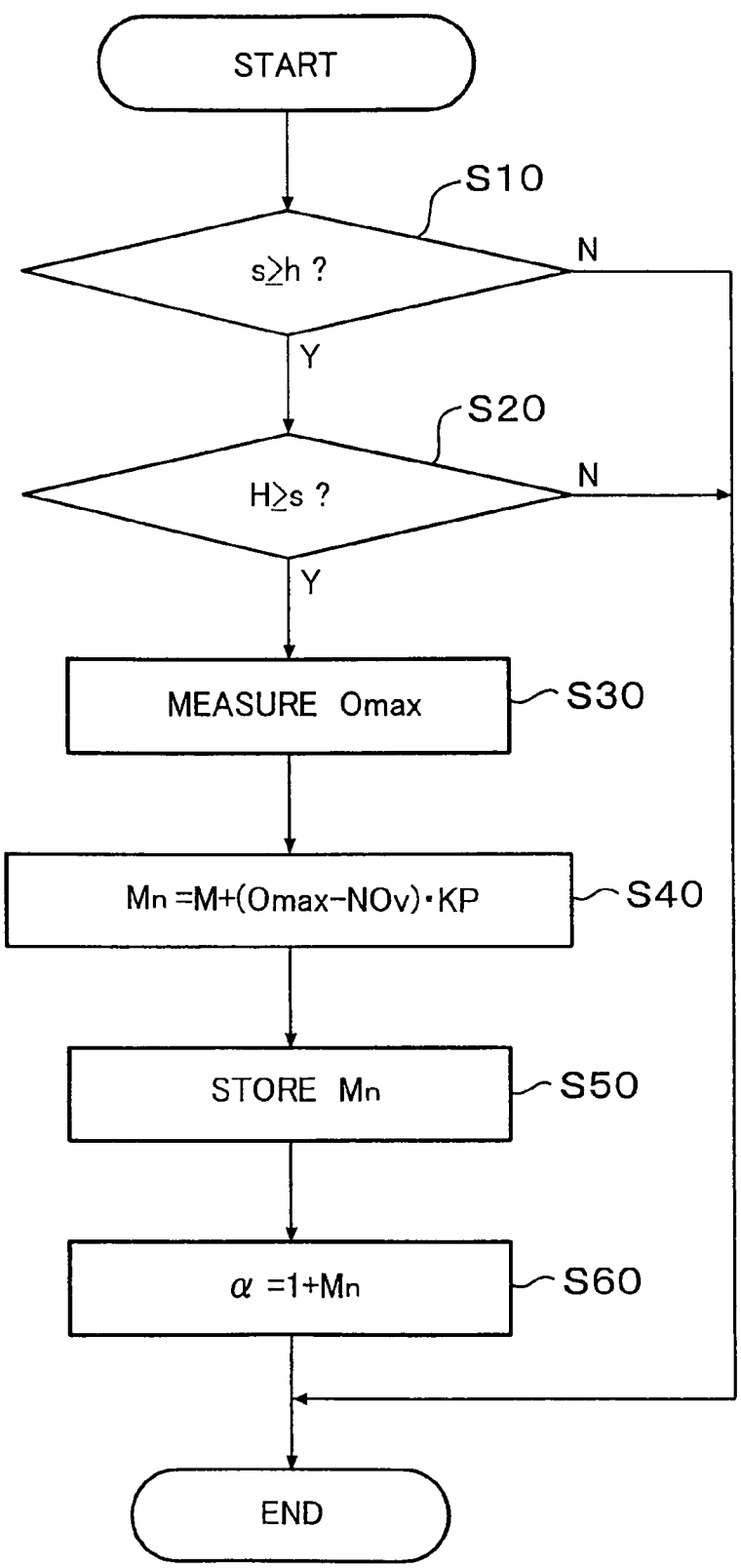
FIG. 2 is a flow chart describing operations of a loop gain modifier in the steerable mirror control system of FIG. 1.

Referring next to the flow chart of FIG. 2, the operations of the loop gain modifier 12 will be described. A period t is set beforehand for the measurement of an actual amount $O_v$ of overshoot. It is to be assumed that the steerable mirror is rotated leftward and rightward from a central value as a reference.

When a current command is outputted from the D/A converter 6 in FIG. 1, an absolute value s of the angle command data 8 and a predetermined first acceptance value h are compared with each other (Step S10). If s≥h, the processing of step S20 is performed. Otherwise, the routine is ended. In step S20, the absolute value s and a predetermined second acceptance value H are compared with each other. If H≥s (that is, H≥s≥h), the processing of step S30 is performed. Otherwise, the routine is ended.

After waiting for rotation of the steerable mirror, a maximum value $O_{max}$ of the actual amount of overshoot during a period t is measured (step S30). From the absolute value of the thus-measured maximum value $O_{max}$ of overshoot and the stored correction value M ($M_{cw}$ or $M_{ccw}$) a new correction value $M_n$ is next determined in accordance with the below-described formula (1), and the thus-determined results are stored (steps S40, S50).

$$M_n = M + (O_{max} - No_v) \cdot KP \qquad (1)$$

where the initial value of M (($M_{cw}$ or $M_{ccw}$) is 0, and KP is a coefficient.

Using the new correction value $M_n$, the coefficient $\alpha$ of the loop gain 10 is replaced by a new value calculated by the following formula (2):

$$\alpha = 1 + M_n \qquad (2)$$

where the initial value of $\alpha$ is 1. (Step S60)

The above-described operations are then repeated at every discrete time.

As the period t for measuring the actual amount $O_v$ of overshoot, it is sufficient if this period is set, for example, at 200 μs or so from a time at which the steerable mirror is programmed to enter the settling range for setting responses.

$O_v$ can be brought closer to $NO_v$ in a shorter time as the coefficient KP is set greater. The correction value $M_n$, however, does not converge at a constant value if KP is set excessively large. It is, therefore, practical to set KP at 0.01 to 1 or so.

If the coefficient KP is determined as will be described hereinafter, it is possible to make the correction value $M_n$ converge promptly. Described specifically, an approximation formula, $M \approx O_{max} \cdot KP$, can be derived from the formula (1), because on the right-hand side of the formula (1), M in the initial state is 0 and $NO_v$ is a constant value. As $KP \approx M/O_{max}$, the coefficient KP can be set at an appropriate value in a short time by actually measuring $O_{max}$ and determining the correction value $M_n$ in that situation.

A description will now be made of reasons for which the correction value M is not changed when s<h or s>H.

When the absolute value s of a command value is smaller than the first acceptance value h (in other words, a rotation angle is small), there is no need to feed a large current to the coil, so that the heat generated by the coil is small and the temperature in the coil rises only a little. When the absolute value s is greater than the second acceptance value H, the total positioning time becomes shorter when the steerable mirror is rotated slowly rather than rapidly. A small current is, therefore, fed to the coil, so that the heat generated by the coil is small and the temperature in the coil rises only a little. When the absolute value s meets H≥s≥h, on the other hand, there is a need to feed a large current to the coil upon acceleration and deceleration of the steerable mirror. Accordingly, the heat generated by the coil rapidly increases, and as a consequence, the internal temperature of the electromagnetic rotary actuator abruptly rises.

Figure 3:
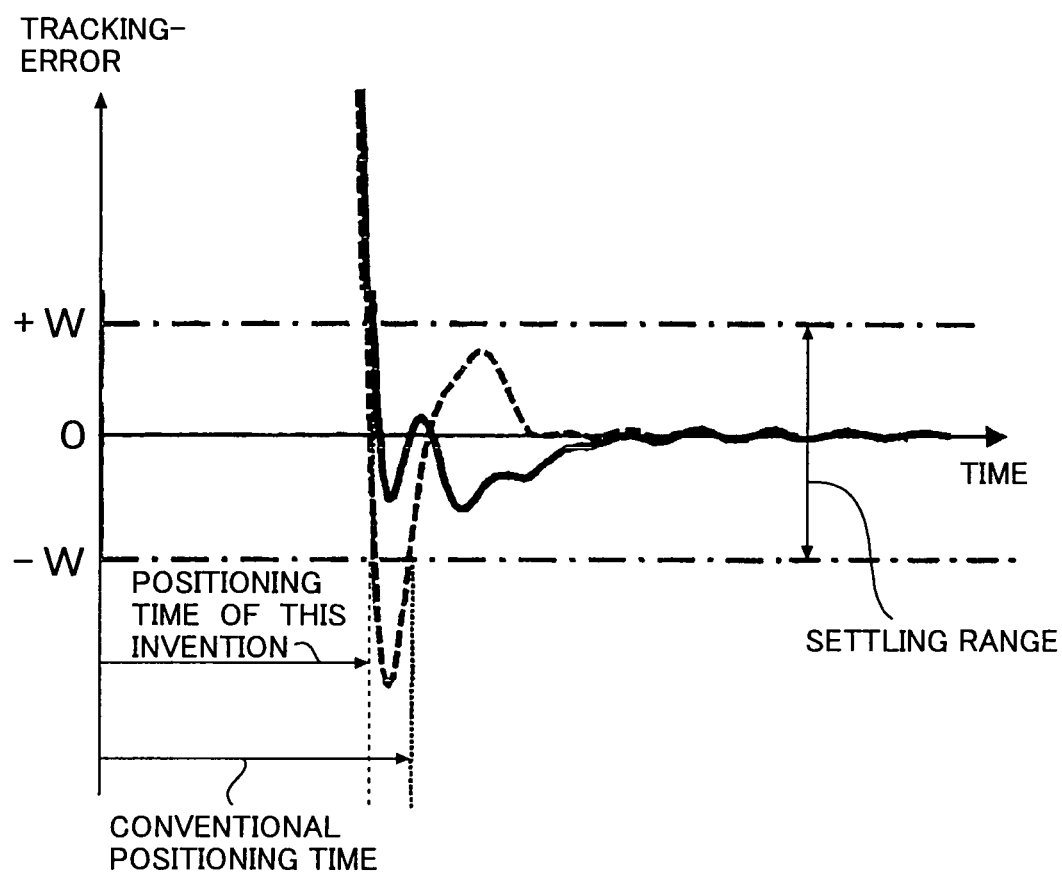
FIG. 3 is a diagram showing an illustrative tracking-error response waveform obtained by the steerable mirror control system of FIG. 1.

FIG. 3 shows illustrative tracking-error response waveforms obtained when the internal temperature of the electromagnetic rotary actuator had arisen. A solid curve indicates a tracking-error response waveform by the steerable mirror control system of Example 1, while a dashed curve indicates a tracking-error response waveform by a conventional steerable mirror control system. It is to be noted that $NO_v$ was set at 30% of a settling range ±W.

As shown in FIG. 3, the application of the present invention allows the amount $O_v$ of overshoot to immediately fall within the settling range, so that a laser beam can be immediately emitted to improve the efficiency of drilling. In the conventional case, on the other hand, the amount $O_v$ of overshoot once varies beyond the lower limit of the settling range. It is, therefore, necessary to wait until the amount $O_v$ of overshoot falls within the settling range, resulting in a longer positioning time.

With the above-described construction, however, a practical inconvenience may arise if the setting of the correction value M or coefficient KP is inadequate. A description will hereinafter be made about this inconvenience.

Figure 4:
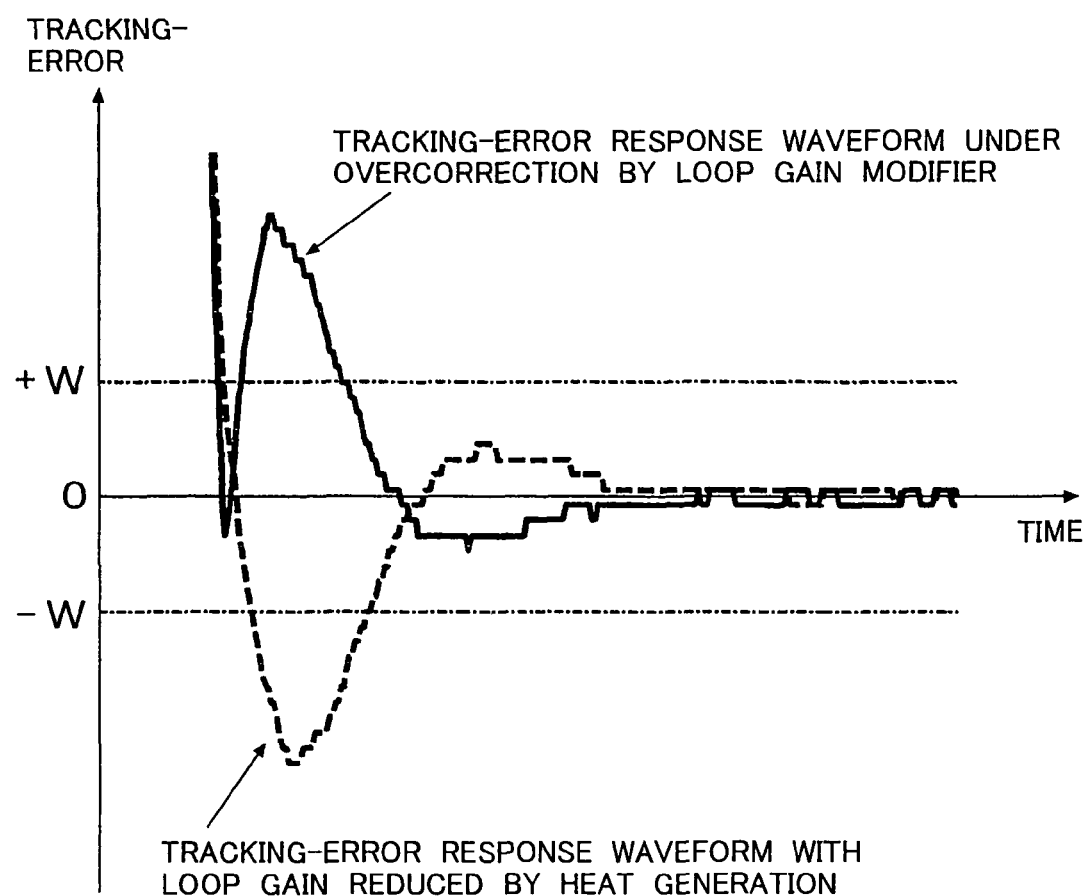
FIG. 4 is a diagram depicting another illustrative tracking-error response waveform obtained by the steerable mirror control system of FIG. 1.

FIG. 4 depicts other illustrative tracking-error response waveforms obtained when the internal temperature of the electromagnetic rotary actuator had arisen. A dashed curve indicates a tracking-error response waveform by the conventional steerable mirror control system, while a solid curve indicates a tracking-error response waveform by the steerable mirror control system of Example 1. In FIG. 4, the dashed dotted lines indicate a settling range.

As shown in FIG. 4, an overshoot which fell outside the settling range occurred with the conventional technology. In the case of the present invention, on the other hand, the maximum value $O_{max}$ of overshoot fell within the settling range owing to the provision of the loop gain modifier, but subsequently, recoiled out of the settling range. A waveform that comes closer to a target position and then comes back from the target position will hereinafter be called "an undershoot", and its magnitude will hereinafter be called "an amount of undershoot".

When deflecting the optical axis of a laser beam by a single steerable mirror, for example, the positioning of the laser beam is not hindered even when the undershoot occurs. When positioning a laser beam in X-Y directions by using two steerable mirrors: one serves to deflect the laser beam in X direction, and the other serves to deflect the laser beam in Y direction, as in a laser drilling machine, however, their moving distances are different from each other so that the occurrence of an undershoot results in a longer positioning time. Disregard for such an undershoot, on the other hand, reduces the positioning accuracy of the laser beam.

Example 2

A description will next be made about a positioning control system for a moving element, which is equipped with a loop gain modifier capable of suppressing not only an overshoot but also an undershoot. It is to be noted that an illustration of a steerable mirror control system of Example 2 in a block diagram is omitted as the block diagram is substantially the same as FIG. 1.

A loop gain modifier 12 of Example 2 is equipped, as in the loop gain modifier of Example 1, with a storage unit, timer unit, comparison unit, decision unit, computing unit and so on. In the storage unit, an amount $NO_v$ of nominal overshoot, an amount $NU_v$ of nominal undershoot, a coefficient KP and a correction value M are stored. The amount $NO_v$ of nominal overshoot and the amount $NU_v$ of nominal undershoot are an overshoot amount and an undershoot amount sufficient to meet a target specification, respectively. Assuming that the settling range of a setting response is ±W, these overshoot and undershoot amounts can be, for example, ±0.3 W, both. The correction value M is provided for each rotating direction. It is to be noted that the steerable mirror control system of Example 2 positions a steerable mirror through similar steps as described above in Example 1.

Figure 5:
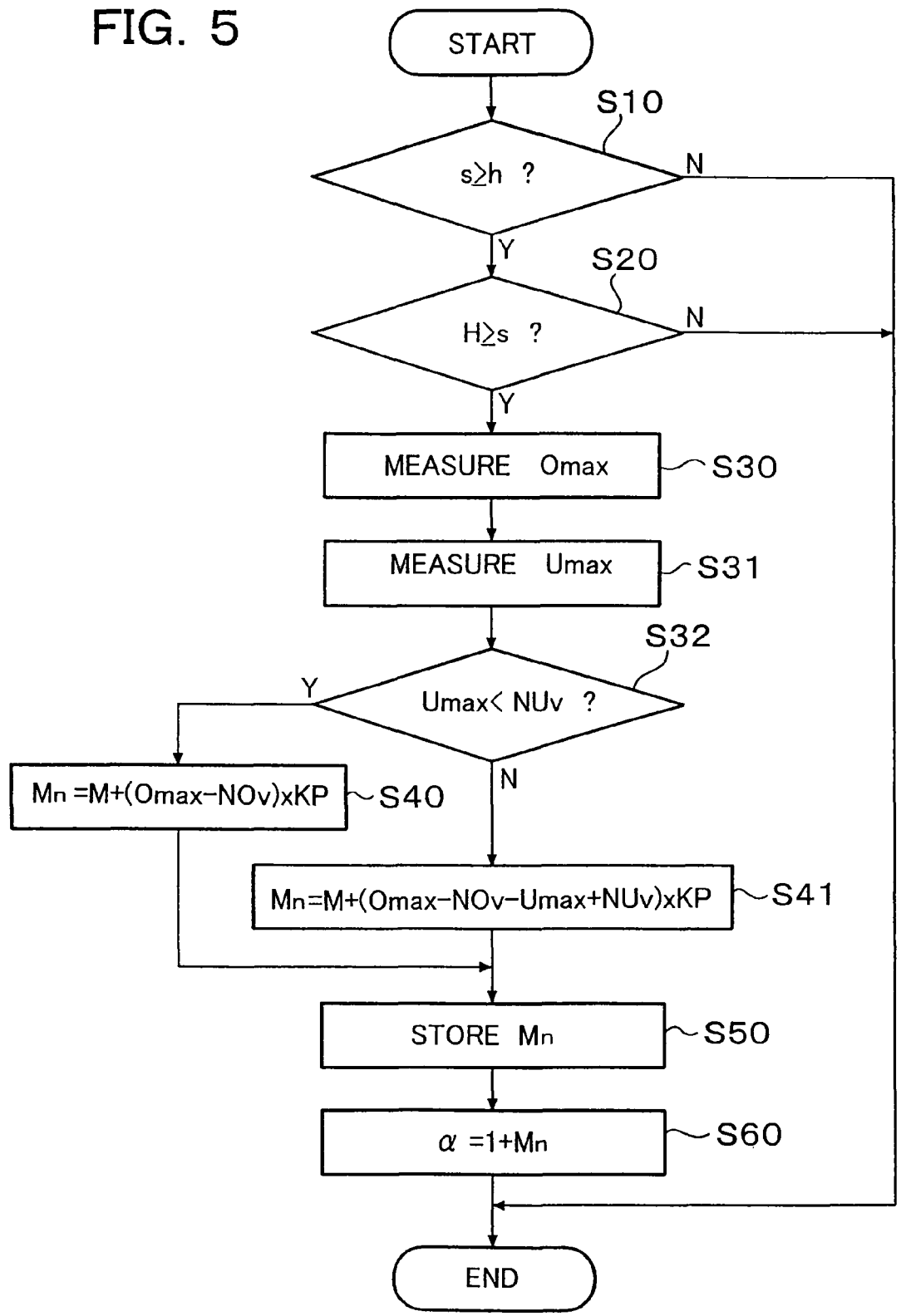
FIG. 5 is a flow chart describing operations of a loop gain modifier in a steerable mirror control system in Example 2 of the present invention.

Referring next to the flow chart of FIG. 5, the operations of the loop gain modifier 12 will be described.

As in Example 1, when a current command is outputted from the D/A converter 6, an absolute values of the angle command data 8 and a predetermined first acceptance value h are compared with each other (Step S10). If s≥h, the processing of step S20 is performed. Otherwise, the routine is ended. In step S20, the absolute value s and a predetermined second acceptance value H are compared with each other. If H≥s (that is, H≥s≥h), the processing of step S30 is performed. Otherwise, the routine is ended.

After waiting for rotation of the steerable mirror, a maximum value $O_{max}$ of the actual amount of overshoot during a period t is measured (step S30). Subsequent to the measurement Of $O_{max}$, a maximum value $U_{max}$ of the actual amount of undershoot during the same period t is measured (step S31).

From the thus-measured maximum value $O_{max}$ of overshoot and the stored nominal amount $NO_v$ of overshoot, the thus-measured maximum value $U_{max}$ of undershoot and the stored nominal amount $NU_v$ of undershoot, and the stored correction value M, a new correction value $M_n$ is next determined in accordance with the above-described formula (1), and the thus-determined results are stored.

$U_{max}$ is not supposed to reflect to the correction formula insofar as it is equal to or smaller than $NU_v$. In other words, the formula (1) should be used when $U_{max} \leq NU_v$, and the following formula (3) should be employed when $U_{max} > NU_v$ (steps S32, S40, S41, S50).

$$M_n = M + (O_{max} - NO_v - U_{max} + NU_v) \cdot KP \quad (3)$$

Using the new correction value $M_n$, the coefficient α of the loop gain 10 is replaced by a new value calculated by the above-described formula (2). It is to be noted that the initial value of α is 1.

The above-described operations are then repeated at every discrete time. When s<h or s>H, the correction value M is not changed for the same reasons as mentioned above in Example 1.

Figure 6:
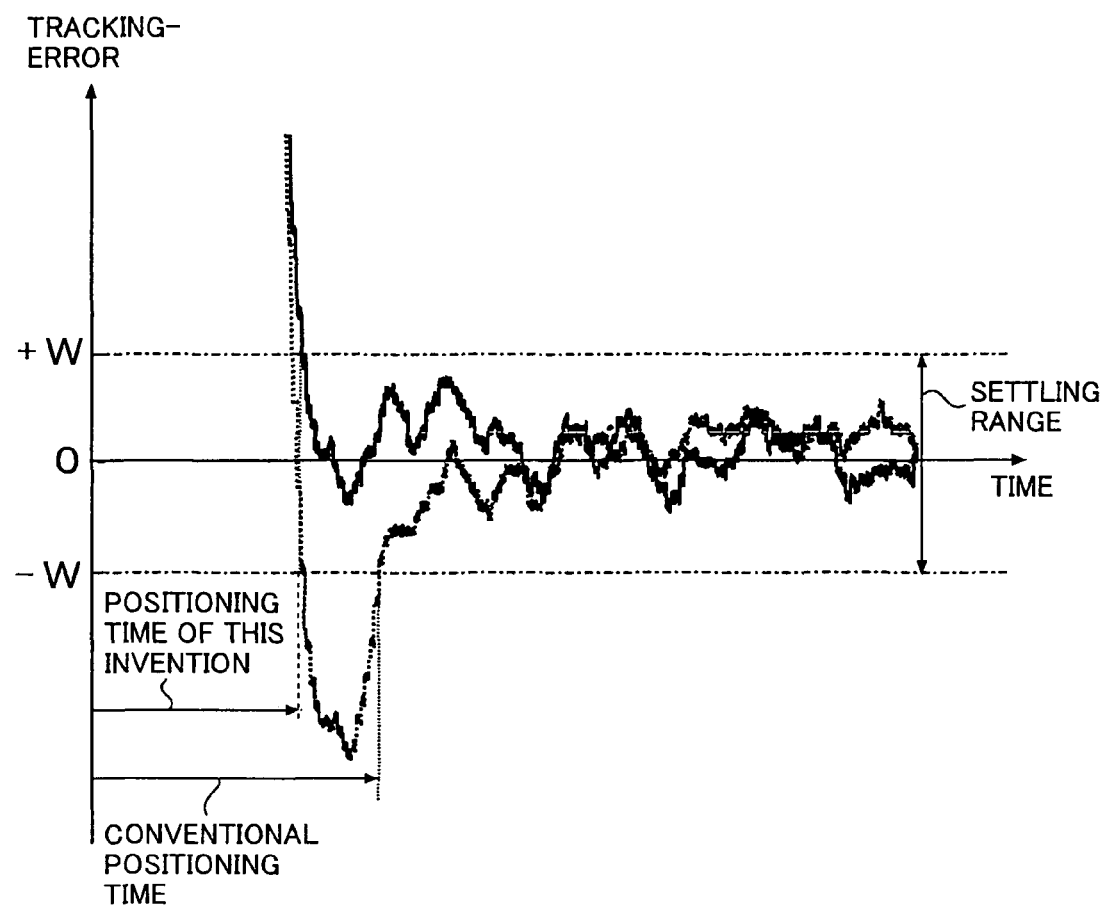
FIG. 6 is a diagram showing an illustrative tracking-error response waveform obtained by the steerable mirror control system of FIG. 5.

FIG. 6 shows illustrative tracking-error response waveforms obtained when the internal temperature of the electromagnetic rotary actuator had arisen. A solid curve indicates a tracking-error response waveform by the steerable mirror control system of Example 2, while a dashed curve indicates a tracking-error response waveform by a conventional steerable mirror control system. It is to be noted that $NO_v$ and $NU_v$ were set at 30% of a settling range ±W.

As shown in FIG. 6, the application of the present invention allows the amount $O_v$ of overshoot to immediately fall within the settling range, so that a laser beam can be immediately emitted to improve the efficiency of drilling. In the case of the conventional steerable mirror control system in which the present invention was not implemented, on the other hand, the amount $O_v$ of overshoot once varies beyond the lower limit of the settling range. It is, therefore, necessary to wait until the amount $O_v$ of overshoot falls within the settling range, resulting in a longer positioning time.

Example 3

Figure 7:
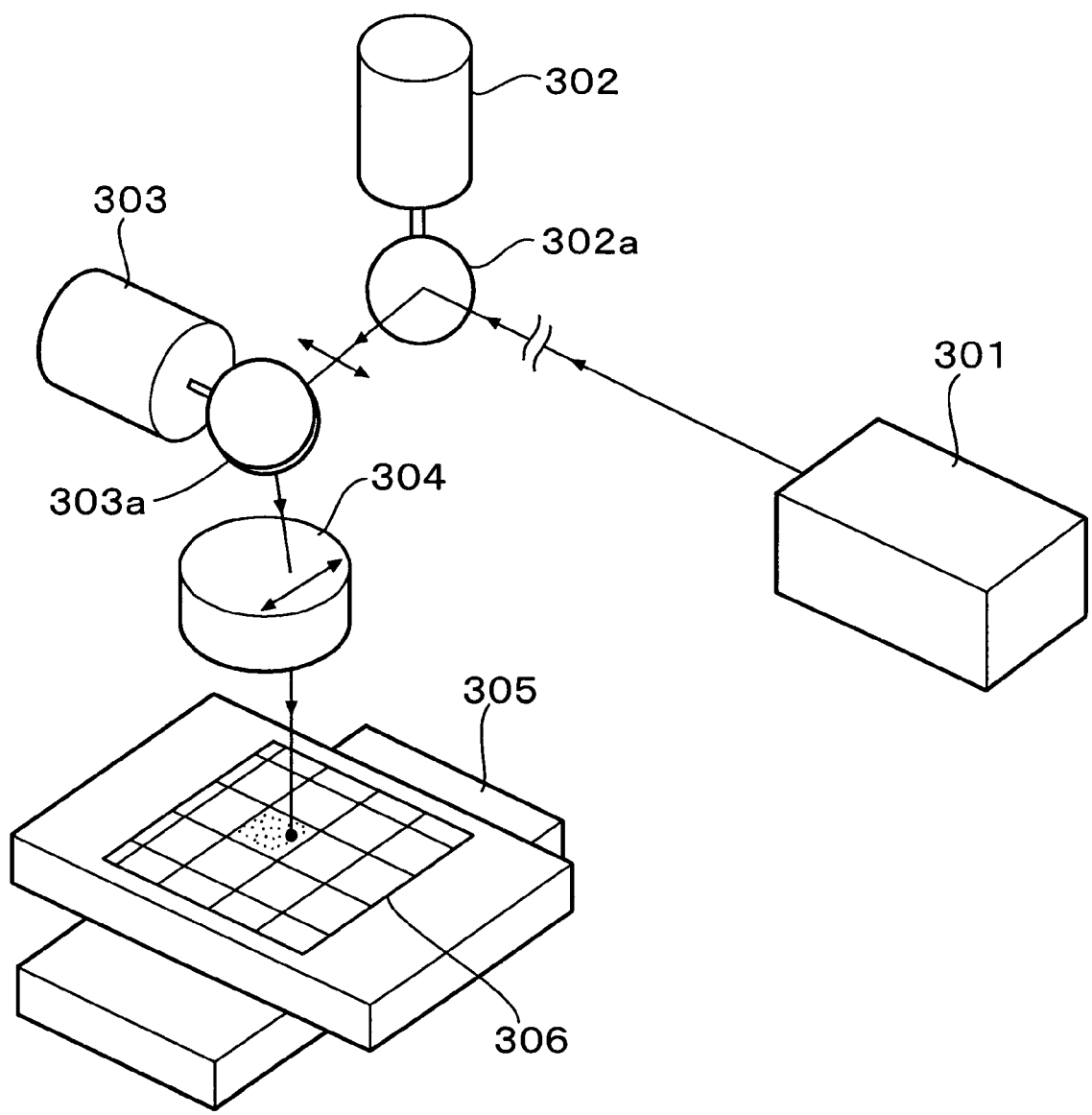
FIG. 7 is a schematic diagram of a laser drilling machine according to the present invention.

With reference to FIG. 7, a description will next be made about a laser drilling machine for drilling a printed circuit board. The laser drilling machine is equipped with two steerable mirror control systems, which are similar to that described above in Example 1 or 2, as galvanometer scanner assemblies to perform modifications of loop gains, respectively.

A laser source 301 oscillates its laser to emit a laser beam. The emission of the laser beam is controlled by a command from a upper-level control. One of the galvanometer scanner assemblies, that is, a galvanometer scanner assembly 302 positions a steerable mirror 302a at an angle, which has been commanded by angle command data, to irradiate the laser beam onto a drilling position. The other galvanometer scanner assembly, that is, a galvanometer scanner assembly 303 positions a steerable mirror 303a at an angle, which has been commanded by angle command data, to emit the laser beam, which has been reflected at the steerable mirror 302a, onto the drilling position. An fθ lens 304 converges the laser beam reflected at the steerable mirror 303a, and irradiate it onto the drilling position on a printed circuit board 306. It is to be noted that the galvanometer scanner assemblies 302,303 are equipped with the functions described above in Example 1. An X-Y table 305 serves to hold and move the printed circuit board 306.

A description will next be made of operations of this laser drilling machine.

The central axis of the fθ lens 304 is positioned at the center of a particular drilling region determined by the galvanometer scanner assemblies 302,303. In a similar manner as in the conventional technology, a laser beam is positioned by the galvanometer scanner assemblies 302,303 to perform drilling within the drilling region. Upon completion of the drilling within the drilling region, the X-Y table 305 is moved to position a next drilling region relative to the fθ lens 304. The above-described operations are then repeated until the drilling of the printed circuit board 306 is completed. The laser drilling machine can perform drilling with excellent efficiency, because the galvanometer scanner assemblies 302, 303 can suppress overshoots which occur as a result of temperature rises.

This application claims the priorities of Japanese patent Application 2006-94719 filed Mar. 30, 2006 and Japanese Patent Application 2006-236121 filed Aug. 31, 2006, both of which are incorporated herein by reference.

The invention claimed is:

1. A positioning control system for positioning a moving element on a basis of position command data and being provided with a feedback loop, comprising:
a loop gain modifier for changing an existing coefficient α of loop gain at a discrete time in a constant sampling cycle, wherein first a new correction value Mn is obtained from the following formula:

$$Mn=M+(O\max-NOv)\cdot KP$$

where M is a stored correction value, Omax is a measured maximum overshoot, NOv is a predetermined nominal overshoot, and KP is a coefficient; and then the existing coefficient α of the loop gain is changed by calculating a new coefficient α with the new correction value Mn from the following formula:

$$\alpha=1+Mn;$$

wherein said loop gain modifier changes the existing coefficient α of the loop gain when an absolute value s of the position command data is in a range H≥s≥h, where h is a predetermined first acceptance value, and H is a predetermined second acceptance value, but not when the absolute value s of the position command data is not in said range.

2. The positioning control system according to claim 1, wherein said moving element is a steerable mirror for drilling holes in a work by reflecting a laser beam.

3. A positioning control system for positioning a moving element on a basis of position command data, said positioning control system being provided with a feedback loop, comprising:
a loop gain modifier for changing an existing coefficient α of loop gain at a discrete time in a constant sampling cycle, wherein first a new correction value Mn is obtained from the following formula:

$$Mn=M+(O\max-NOv-U\max+NUv)\cdot KP$$

where M is a stored correction value, Omax is a measured maximum overshoot, Umax is a measured maximum undershoot, NOv is a predetermined nominal overshoot, NUv is a predetermined nominal undershoot, and KP is a coefficient; and then the existing coefficient α of the loop gain is replaced changed by calculating a new coefficient α with the new correction value Mn from the following formula:

$$\alpha=1+Mn;$$

wherein said loop gain modifier changes the existing coefficient α of the loop gain when an absolute value s of the position command data is H≥s≥h, where h is a predetermined first acceptance value, and H is a predetermined second acceptance value, but not when the absolute value s of the position command data is not in said range.

4. The positioning control system according to claim 3, wherein said moving element is a steerable mirror for drilling holes in a work by reflecting a laser beam.

5. The positioning control system according to claim 3, wherein a first absolute value of a first tolerance and a second absolute value of a second tolerance are the same as each other.

6. The positioning control system according to claim 5, wherein, based on a distance or angle over which said moving element is to be moved in a current positioning operation, said loop gain modifier determines when a modification is to be performed and when no modification is to be performed.

7. The positioning control system according to claim 6, wherein said moving element is a steerable mirror for drilling holes in a work by reflecting a laser beam.

8. The positioning control system according to claim 5, wherein said moving element is a steerable mirror for drilling holes in a work by reflecting a laser beam.

9. A laser drilling machine comprising the positioning control system according to claim 1.

10. A laser drilling machine comprising the positioning control system according to claim 2.

11. A laser drilling machine comprising the positioning control system according to claim 3.

12. A laser drilling machine comprising the positioning control system according to claim 4.

13. A laser drilling machine comprising the positioning control system according to claim 7.

14. A laser drilling machine comprising the positioning control system according to claim 8.

* * * * *